US010582085B2

(12) United States Patent
Ma

(10) Patent No.: US 10,582,085 B2
(45) Date of Patent: Mar. 3, 2020

(54) METHOD AND DEVICE FOR IMAGE PROCESSING, AND APPARATUS FOR IMAGE FORMATION

(71) Applicant: ZHUHAI SEINE TECHNOLOGY CO., LTD., Zhuhai (CN)

(72) Inventor: Yangxiao Ma, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 16/183,147

(22) Filed: Nov. 7, 2018

(65) Prior Publication Data
US 2019/0075217 A1  Mar. 7, 2019

Related U.S. Application Data

(63) Continuation of application No. PCT/CN2017/090604, filed on Jun. 28, 2017.

(30) Foreign Application Priority Data

Jul. 12, 2016  (CN) .......................... 2016 1 0554481

(51) Int. Cl.
*H04N 1/407* (2006.01)
*H04N 1/387* (2006.01)
(Continued)
(52) U.S. Cl.
CPC ....... *H04N 1/3878* (2013.01); *H04N 1/00718* (2013.01); *H04N 1/00774* (2013.01); *H04N 1/405* (2013.01)

(58) Field of Classification Search
None
See application file for complete search history.

(56) References Cited

U.S. PATENT DOCUMENTS 6,636,649 B1 * 10/2003 Murata ................ G06K 9/3283
382/293
8,358,871 B2 *  1/2013 Tu ........................ G06K 9/3208
348/618
(Continued)

FOREIGN PATENT DOCUMENTS

CN       1351311 A     5/2002
CN     101340502 A     1/2009
(Continued)

OTHER PUBLICATIONS

The World Intellectual Property Organization (WIPO) International Search Report for PCT/CN2017/090604 dated Sep. 20, 2017 5 Pages.

*Primary Examiner* — Dung D Tran
(74) *Attorney, Agent, or Firm* — Anova Law Group, PLLC

(57) ABSTRACT

Method, device, and storage medium for image processing, and apparatus for image formation are provided. The method includes obtaining original image data and detecting a tilt angle of an image according to the original image data. The method also includes performing a binarization processing on the original image data to obtain binarized image data. The binarization processing and detecting the tilt angle are performed in parallel. Further, the method includes performing a rotation correction on the binarized image data according to the detected tilt angle.

20 Claims, 8 Drawing Sheets

(51) Int. Cl.
*H04N 1/00* (2006.01)
*H04N 1/405* (2006.01)

(56) References Cited

U.S. PATENT DOCUMENTS

| | | | |
|---|---|---|---|
| 2002/0028027 A1 | 3/2002 | Koyama | |
| 2005/0281483 A1* | 12/2005 | Teng | G06K 9/3283 |
| | | | 382/289 |
| 2006/0126965 A1* | 6/2006 | Song | G06K 9/3275 |
| | | | 382/289 |
| 2007/0237558 A1 | 10/2007 | Nakanishi | |
| 2008/0226196 A1* | 9/2008 | Kojima | G06K 9/3275 |
| | | | 382/289 |
| 2009/0231639 A1* | 9/2009 | Iwayama | H04N 1/3873 |
| | | | 358/488 |
| 2009/0262370 A1* | 10/2009 | Mantell | H04N 1/4051 |
| | | | 358/1.9 |
| 2010/0141991 A1* | 6/2010 | Yoshida | H04N 1/3878 |
| | | | 358/1.15 |
| 2010/0215285 A1 | 8/2010 | Tu et al. | |
| 2010/0271646 A1* | 10/2010 | Morimoto | G03G 15/5025 |
| | | | 358/1.9 |
| 2011/0085216 A1 | 4/2011 | Noh | |
| 2015/0009520 A1* | 1/2015 | Yamada | H04N 1/3878 |
| | | | 358/1.14 |
| 2015/0063673 A1* | 3/2015 | Bu | G06Q 20/042 |
| | | | 382/137 |

FOREIGN PATENT DOCUMENTS

| | | |
|---|---|---|
| CN | 101374198 A | 2/2009 |
| CN | 101472042 A | 7/2009 |
| CN | 101540816 A | 9/2009 |
| CN | 101662581 A | 3/2010 |
| CN | 101697228 A | 4/2010 |
| CN | 201548807 U | 8/2010 |
| CN | 102542266 A | 7/2012 |
| CN | 102789658 A | 11/2012 |
| CN | 106131362 A | 11/2016 |

* cited by examiner

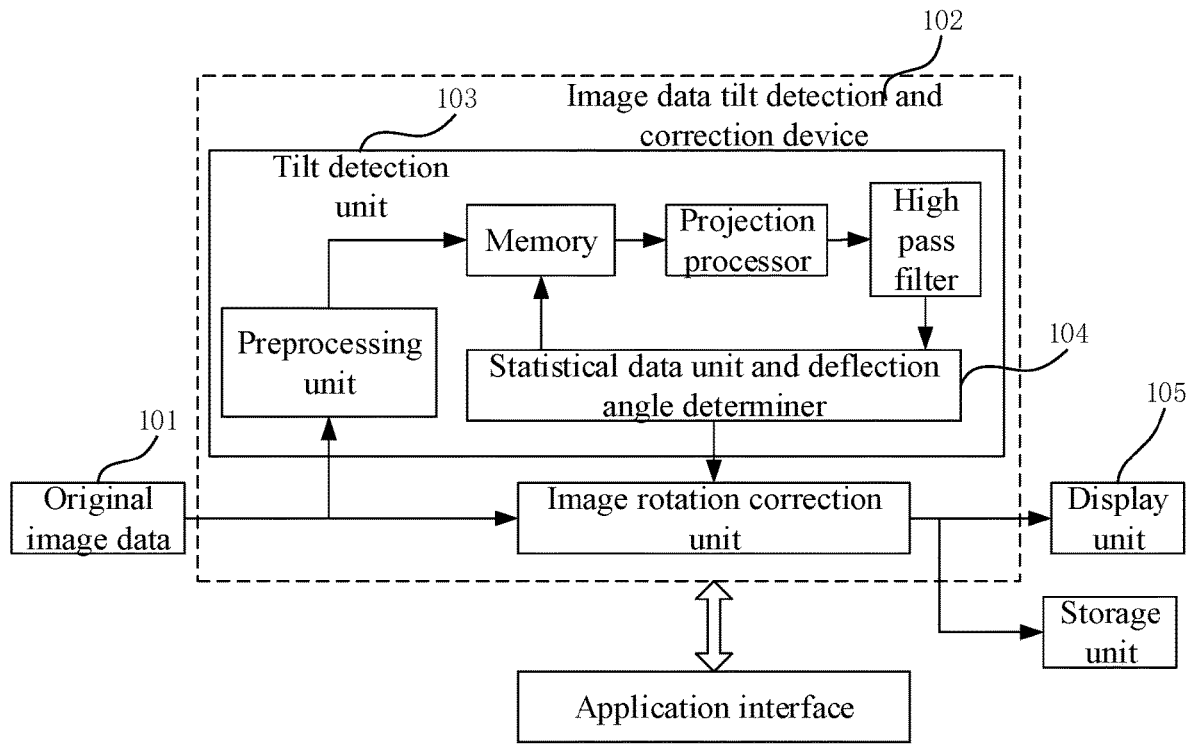
Figure 1: Prior Art
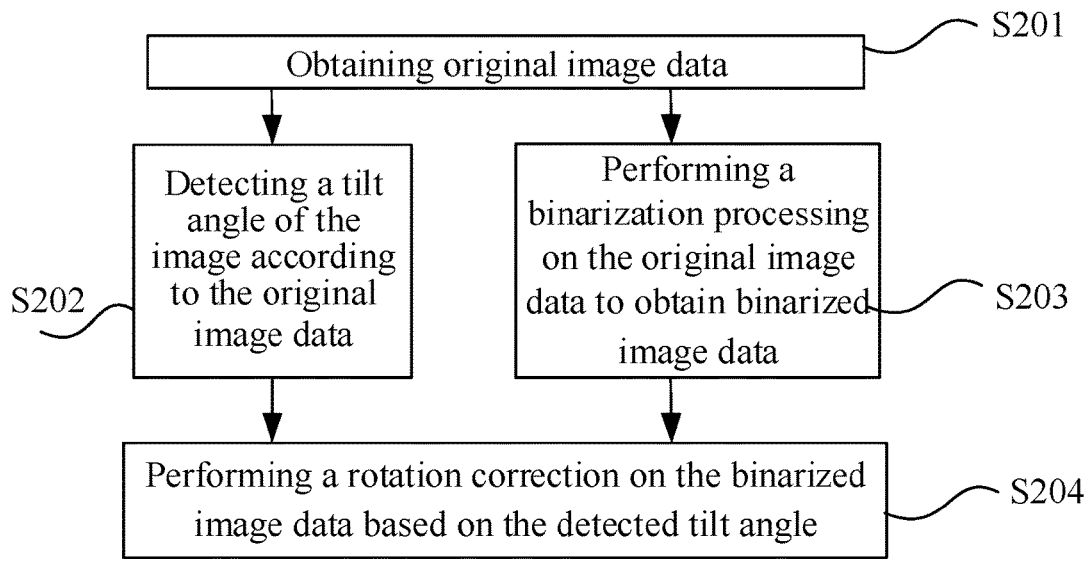
Figure 2

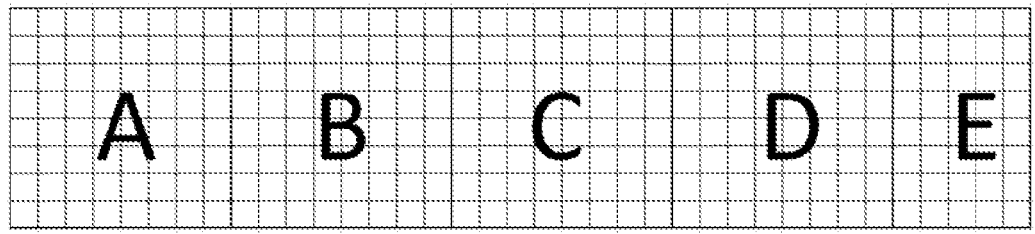
Figure 5
| a1 | a2 | a3 |
|----|----|----|
| a4 | a5 | a6 |
| a7 | a8 | a9 |
Figure 6
| a1 | a2 | a3 |
|----|----|----|
| a4 | a5 | a6 |
| a7 | a8 | a9 |
| 255 | 255 | 255 |
|-----|-----|-----|
| 255 | 0   | 255 |
| 255 | 255 | 255 |
| 255 | 255 | 255 |
|-----|-----|-----|
| 255 | 255 | 255 |
| 255 | 255 | 255 |
Figure 7
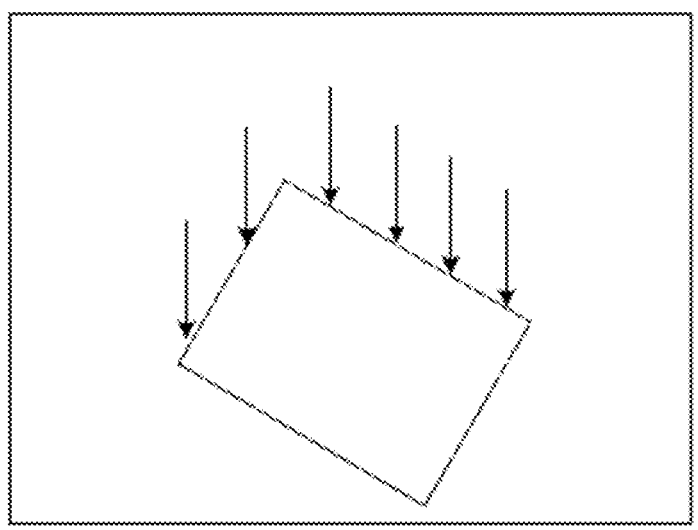
Figure 8

METHOD AND DEVICE FOR IMAGE PROCESSING, AND APPARATUS FOR IMAGE FORMATION

CROSS-REFERENCES TO RELATED APPLICATIONS

This application is a continuation application of PCT Patent Application No. PCT/CN2017/090604, filed on Jun. 28, 2017, which claims the priority of Chinese patent application No. 201610554481.X, filed on Jul. 12, 2016, and titled "METHOD AND DEVICE FOR IMAGE PROCESSING, AND APPARATUS FOR IMAGE FORMATION", the entirety of all of which is incorporated herein by reference.

FIELD OF THE DISCLOSURE

The present disclosure generally relates to the field of electronic technology and, more particularly, relates to a method and device for image processing, and an apparatus for image formation.

BACKGROUND

With the development of optoelectronic technology, image digitization technology has been continuously improved and has been widely applied in an apparatus for image formation. The apparatus for image formation may be an image scanning apparatus, a copying apparatus, a fax apparatus, and a multi-function apparatus, etc. In such apparatus for image formation, a glass platen on which documents or card type materials are placed is usually provided, and an image reader (e.g., a CIS (contact image sensor) or a CCD (charge coupled device)) is disposed above and/or below the glass platen. The originals placed on the glass platen can be converted into digital images through the image reader. Therefore, the image scanning apparatus can obtain a picture file in a predetermined format or a PDF file through the image reader and an image processing unit in the image scanning apparatus. The copying apparatus can convert image data of the picture file acquired by the image reader into control parameters capable of being recognized by an engine unit in the copying apparatus for accomplishing a copying function, and can form a predetermined image on an imaging medium through the engine unit. The fax apparatus can convert the originals into image data capable of being recognized by the fax apparatus through the image reader and the image processing unit in the fax apparatus, and can transmit the image data through a signal output unit in the fax apparatus. The multi-function apparatus can respectively accomplish one or more of copying, scanning and fax through the image reader and corresponding function units in the multi-function apparatus.

However, for the apparatus for image formation, a size of the document or the card type material is often smaller than a size of the platen on which the originals are placed in the apparatus for image formation, and, thus, it is difficult for a user to accurately place the original in an area that meets the requirements. Therefore, the image data ultimately acquired by the apparatus for image formation may be tilted, resulting in a poor user experience.

At present, a solution to such tilted image issue is shown in FIG. 1. The device for image processing provided in FIG. 1 is provided with an image data tilt detection and correction device 102. An image rotation correction unit in the image data tilt detection and correction device 102 performs rotation correction on an original image data 101 (data obtained by an image reader), and then the ultimate data is displayed on a display unit 105. Therefore, the image original data can be automatically corrected. Parameters of the image rotation correction unit requires are detected and acquired in real time by a statistical data unit and tilt angle determiner 104 in a tilt detection unit 103, thereby ensuring desired performance of the tilt correction.

Although the device for image processing in FIG. 1 can implement the image automatic correction function, the scheme shown in FIG. 1 directly performs the tilt correction on the entire original image. The original image data occupies large memory, therefore, the requirements for the hardware of the image data tilt detection and correction device 102 are substantially high, and the processing speed is slow. The disclosed method, device and apparatus are directed to solve one or more problems set forth above and other problems in the art.

BRIEF SUMMARY OF THE DISCLOSURE

One aspect of the present disclosure includes a method for image processing. The method includes obtaining original image data and detecting a tilt angle of an image according to the original image data. The method also includes performing a binarization processing on the original image data to obtain binarized image data. The binarization processing and detecting the tilt angle are performed in parallel. Further, the method includes performing a rotation correction on the binarized image data according to the detected tilt angle.

In one embodiment, detecting the tilt angle of the image includes: identifying an image area according to the original image data; and based on the image area corresponding to the original image data, detecting the tilt angle of the image.

In one embodiment, performing the binarization processing includes: according to the image area corresponding to the original image data, identifying and obtaining an image area corresponding to the binarized image data; and according to the image area corresponding to the binarized image data, finding out an image area corresponding to the binarized image data after a background removal.

In one embodiment, detecting the tilt angle of the image according to the original image data includes: identifying a boundary of the image; obtaining coordinates of two data points from a same boundary of the image; and calculating the tilt angle of the image using the coordinates of the two data points.

In one embodiment, performing the binarization processing on the original image data includes converting the original image data into the binarized image data using one of a threshold matrix algorithm and an error-diffusion algorithm.

In one embodiment, the original image data is M-bit data, and the binarized image data is N-bit data, wherein M and N are positive integers, and M is greater than N.

In one embodiment, the image includes a plurality of image blocks, and detecting the tilt angle of the image further includes: calculating an average value of pixel values of pixels in each image block; calculating a mean square deviation of a pixel value of each pixel and the average value in the each image block; calculating an average value of a sum of mean square deviations in each image block; determining whether the average value of the sum of the mean square deviations in each image block is greater than a threshold value; and assigning a pixel value of one of 0 and 255 to a corresponding image block according to a determination result.

Another aspect of the present disclosure includes a device for image processing. The device includes a memory storing program instructions for a method for image processing, and one or more processors coupled to the memory. When executing the program instructions, the one or more processors are configured to obtain original image data, and detect a tilt angle of an image according to the original image data. The one or more processors are also configured to perform a binarization processing on the original image data to obtain binarized image data. The binarization processing and detecting the tilt angle are performed in parallel. Further, the one or more processors are configured to perform a rotation correction on the binarized image data according to the detected tilt angle.

In one embodiment, the one or more processors are further configured to: identify an image area according to the original image data; and based on the image area corresponding to the original image data, detect the tilt angle of the image.

In one embodiment, the one or more processors are further configured to: according to the image area corresponding to the original image data, identify and obtain an image area corresponding to the binarized image data; and according to the image area corresponding to the binarized image data, find out an image area corresponding to the binarized image data after a background removal.

In one embodiment, the one or more processors are further configured to: identify a boundary of the image; obtain coordinates of two data points from a same boundary of the image; and calculate the tilt angle of the image using the coordinates of the two data points.

In one embodiment, the one or more processors are further configured to convert the original image data into the binarized image data using one of a threshold matrix algorithm and an error-diffusion algorithm.

In one embodiment, the original image data is M-bit data, and the binarized image data is N-bit data, wherein M and N are positive integers, and M is greater than N.

Another aspect of the present disclosure includes an apparatus for image formation. The apparatus includes the disclosed device for image processing.

Another aspect of the present disclosure includes a non-transitory computer readable storage medium containing computer-executable program instructions for, when executed by a processor, performing a method for image processing. The method includes obtaining original image data and detecting a tilt angle of an image according to the original image data. The method also includes performing a binarization processing on the original image data to obtain binarized image data. The binarization processing and detecting the tilt angle are performed in parallel. Further, the method includes performing a rotation correction on the binarized image data according to the detected tilt angle.

In one embodiment, detecting the tilt angle of the image includes: identifying an image area according to the original image data; and based on the image area corresponding to the original image data, detecting the tilt angle of the image.

In one embodiment, performing the binarization processing includes: according to the image area corresponding to the original image data, identifying and obtaining an image area corresponding to the binarized image data; and according to the image area corresponding to the binarized image data, finding out an image area corresponding to the binarized image data after a background removal.

In one embodiment, detecting the tilt angle of the image according to the original image data includes: identifying a boundary of the image; obtaining coordinates of two data points from a same boundary of the image; and calculating the tilt angle of the image using the coordinates of the two data points.

In one embodiment, performing the binarization processing on the original image data includes converting the original image data into the binarized image data using one of a threshold matrix algorithm and an error-diffusion algorithm.

In one embodiment, the original image data is M-bit data, and the binarized image data is N-bit data, wherein M and N are positive integers, and M is greater than N.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 1 illustrates a structural schematic diagram of a device for image processing;

FIG. 2 illustrates a flow chart of an exemplary method for image processing consistent with various disclosed embodiments of the present disclosure;

FIG. 5 illustrates a schematic diagram of exemplary image blocks consistent with various disclosed embodiments of the present disclosure;

FIG. 6 illustrates a schematic diagram of an exemplary 3×3 image block consistent with various disclosed embodiments of the present disclosure;

FIG. 7 illustrates a schematic diagram of an exemplary expansion processing principle consistent with various disclosed embodiments of the present disclosure;

FIG. 8 illustrates a schematic diagram of an exemplary image area delineation principle consistent with various disclosed embodiments of the present disclosure;

DETAILED DESCRIPTION

Figure 3:
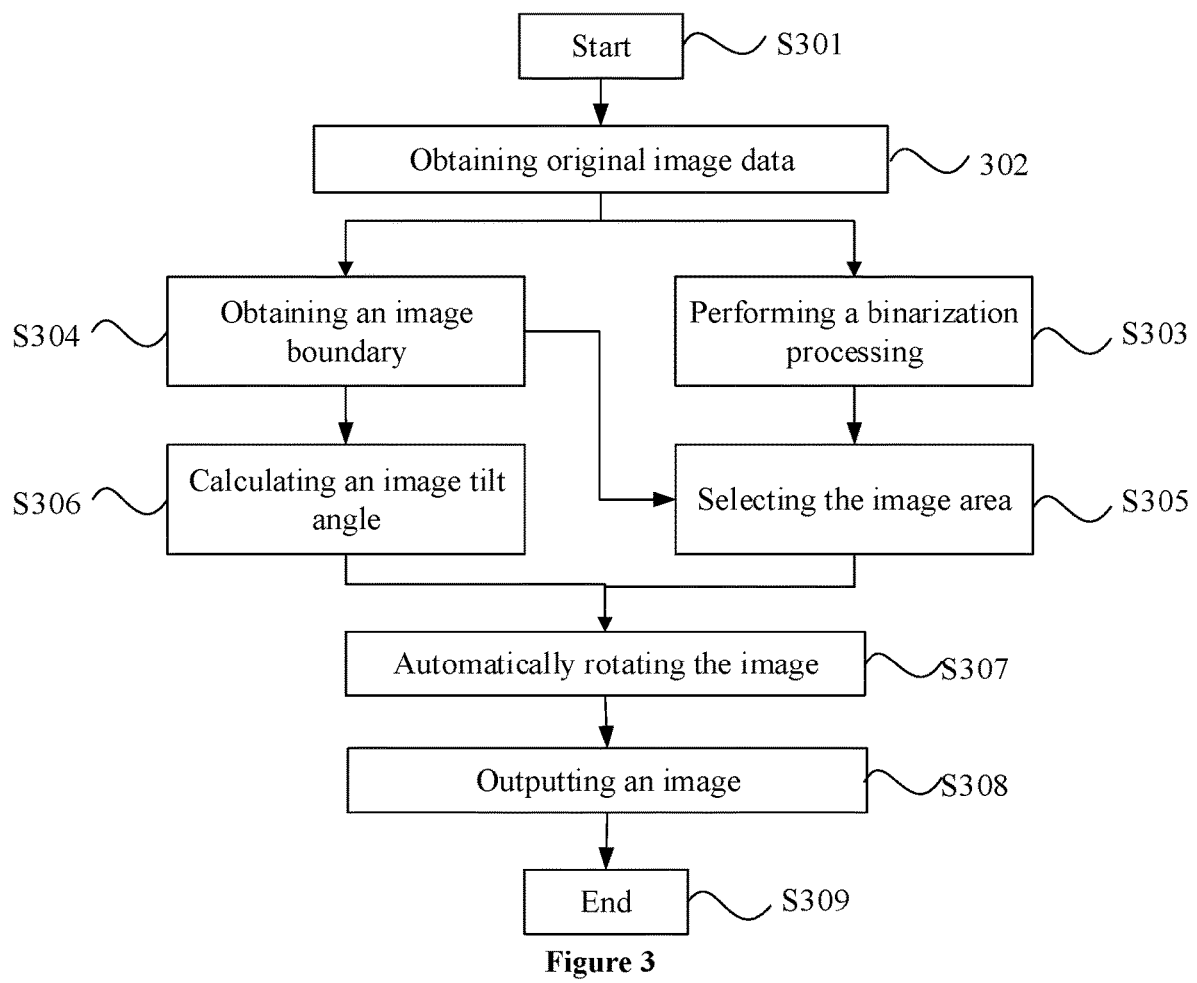
FIG. 3 illustrates a flow chart of another exemplary method for image processing consistent with various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

FIG. 2 illustrates a flow chart of an exemplary method for image processing consistent with various disclosed embodiments of the present disclosure. Referring to FIG. 2, the method for image processing may include the following.

S201: Obtaining original image data. The original image data may generally refer to data obtained by an image reader, and the data may include data in an image area of an original on the platen and data in a background area of the platen except for the image area.

The image data obtained by the image reader may be referred to the original image data. The image reader may generate Band data based on scanning signal, after scanning predetermined row(s), and a quantity of rows corresponding to the Band data may be selected according to parameter characteristics of the image reader or corresponding parameter characteristics of a controller connected to the image reader. The Band data may be 8-bit image data having a corresponding grayscale in a range of approximately 0-255.

S202: Detecting a tilt angle of the image according to the original image data. The detailed detection method of the image tilt angle will be described later. In the present disclosure, the detection of the tilt angle may be based on the original image data, and, thus, the accuracy of the detection result may be substantially high.

S203: Performing a binarization processing on the original image data to obtain binarized image data. The binarization processing in S203 may be performed in parallel with the detection of tilt angle in S202. In other words, S203 and S202 may be performed in parallel.

In one embodiment, S203 and S202 may be performed simultaneously. However, the simultaneous execution in the present disclosure may not limit S203 and S202 to start at the same time and to end at the same time. In an application scenario where the requirement for image processing speed is not particularly high, S203 and S202 may have a sequence when being performed in parallel.

In one embodiment, S203 may include converting the original image data into the binarized image data using a threshold matrix algorithm or an error-diffusion algorithm. The original image data may be M-bit data, the binarized image data may be N-bit data, where M and N may be natural numbers, and M may be greater than N. For example, the original image data may be 8-bit data, and the binarized image data may be 4-bit, 2-bit or 1-bit data.

After performing the binarization processing, the amount of data may be greatly reduced, thereby reducing the requirements for hardware and increasing the data processing speed. After performing the binarization processing, the amount of data may be reduced, and, thus, the size of image data that desires rotation correction may be greatly reduced, the requirements for hardware may be reduced, and the data processing speed may be substantially fast. The binarization processing and the detection of tilt angle may be performed in parallel, and, thus, the device for image processing may have a desired processing speed. In addition, because the binarization processing and the detection of tilt angle are performed in parallel, the detection result of the tilt angle may not be affected by the binarized image.

S204: Performing a rotation correction on the binarized image data based on the detected tilt angle.

Because the original image data includes the data in the background area, the image area may desire to be identified to remove the data in the background area from the original image data. Therefore, in certain embodiments, S202 may include identifying the image area based on the original image data, and detecting the tilt angle of the image in the image area. Accordingly, S203 may include according to the identified image area in S202, identifying and obtaining an image area corresponding to the binarized image data; and according to the obtained image area in the binarized image data, figuring out the image area in the binarized image data after removing the background area.

In one embodiment, detecting the image tilt angle according to the original image data in S202 may include the following:

a: Identifying a boundary of the image;
b: Obtaining coordinates of two data points from a same boundary of the image; and
c: Calculating the image tilt angle using the coordinates of the two data points.

The angle detection process in a-c may desire a small amount of data, which may further reduce the requirements for hardware resources and improve the angle detection speed.

The method for image processing in the present disclosure may greatly reduce the amount of data desired for processing by the device for image processing by performing the binarization processing on the original image data, thereby reducing requirements for hardware of the image tilt correction device, and improving image processing speed.

FIG. 3 illustrates a flow chart of another exemplary method for image processing consistent with various disclosed embodiments of the present disclosure. Referring to FIG. 3, the method for image processing may include the following.

S301: Start. After receiving an image processing command, the device for image processing may start preparing for subsequent image correction procedures.

S302: Obtaining original image data. User's original document data may be read by the image reader, and the read data may be converted into grayscale data. The grayscale data may be the original image data.

S303: Performing a binarization processing on the original image data. The original image data may be converted into binarized data with a small amount of data through the binarization processing. The detailed conversion process may use a commonly used binarization algorithm, such as a threshold matrix algorithm or an error-diffusion algorithm. The binarized image data may have an amount of data smaller than the original image data, and, thus, may have a small memory usage. Therefore, the image processing speed may be improved.

S304: Obtaining an image boundary. The image boundary may be obtained by identifying the image area of the original on the glass platen, which may provide the basis for performing angle detection on data in the image area.

S305: Selecting the image area. Selecting the image area may refer to according to the obtained image area corresponding to binarized image data after performing the binarization processing on the original image, figuring out the image area after removing background area.

S306: Calculating an image tilt angle. According to coordinates of two data points obtained from the image boundary, the tilt angle of the image area may be calculated. The detailed calculation method will be described in detail later with reference to FIG. 4.

In one embodiment, S305 may be performed after performing S303 and S304. S306 may be performed after performing S304. There is no certain sequence restriction for performing S303 and S304. There is no certain sequence restriction for performing S303 and S306.

S307: Automatically rotating the image. According to the tilt angle obtained in S306, the whole image area selected in S305 may be automatically rotated.

S308: Outputting an image. The rotated image may be outputted.

Depending on different application scenarios of the device for image processing, the rotated image may be outputted to different devices. For example, when the method for image processing is applied to an image scanning apparatus, the rotated image may be outputted to the peripheral connected to the image scanning apparatus. When the method for image processing is applied to a copying apparatus, the rotated image may be outputted to a controller of the copying apparatus, and the rotated image data may be converted into data required by an execution copying engine in the copying apparatus. When the method for image processing is applied to a fax apparatus, the rotated image may be outputted to a controller of the fax apparatus, the rotated image data may be converted into data capable of being identified by a signal output unit in the fax apparatus, and then the image data may be outputted.

S309: End.

Figure 4:
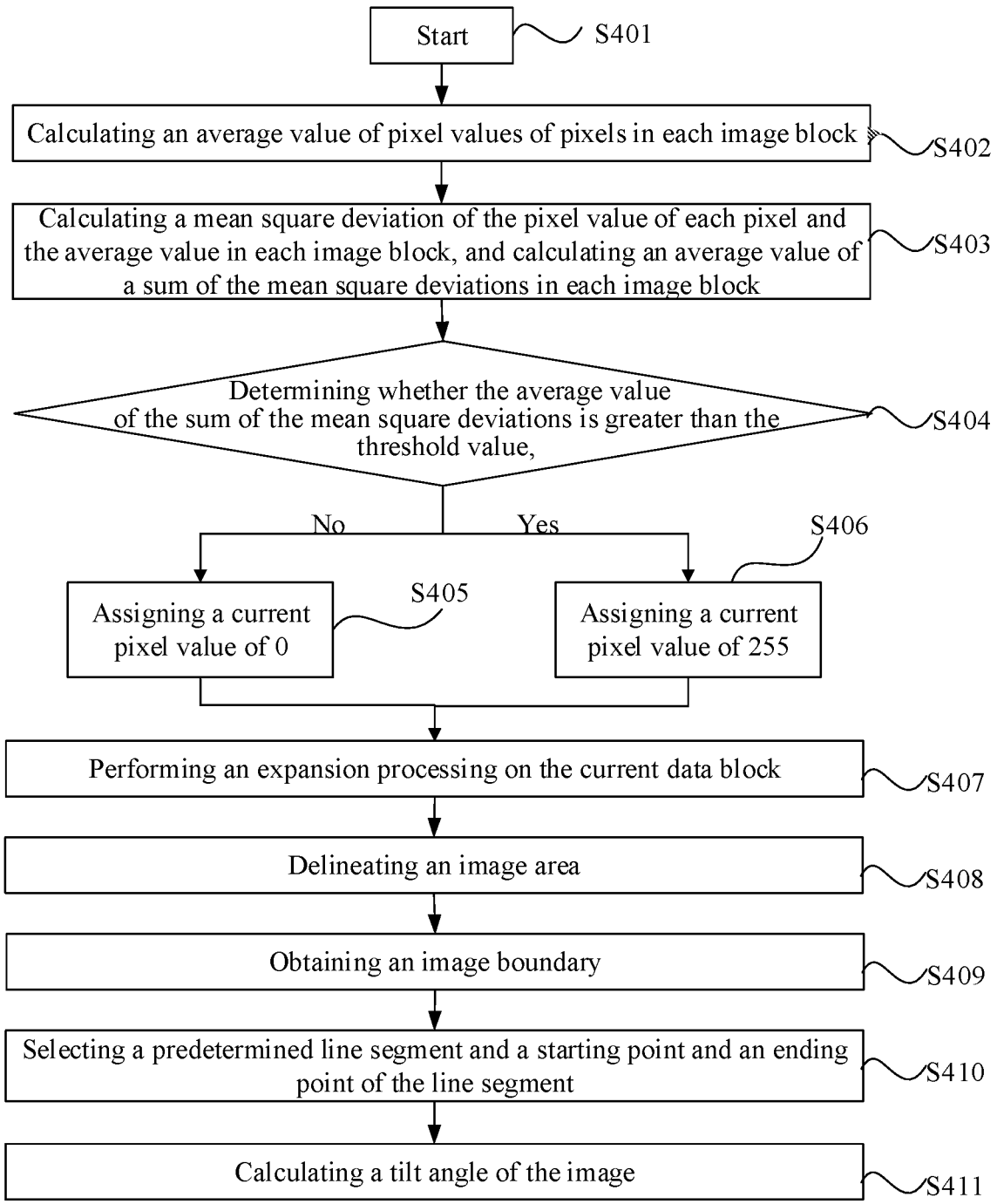
FIG. 4 illustrates a flow chart of an exemplary process for calculating an image tilt angle consistent with various disclosed embodiments of the present disclosure.

In one embodiment, calculating the image tilt angle in S306 may be described as follows with reference to FIG. 4.

S401: Start.

S402: Calculating an average value of pixel values of pixels in each image block (also referred as patch). Each image block may be different from the above-described Band. An original image may include a plurality of Band data, and one Band data may include a plurality of image blocks. Referring to FIG. 5, which overall illustrates Band data, the Band data may include five image blocks: A, B, C, D, and E. A common image block may be an 8×8 image block. In other words, a common image block may include 8×8 pixels.

S403: Calculating a mean square deviation of the pixel value of each pixel and the average value in each image block, and calculating an average value of a sum of the mean square deviations in each image block. The mean square deviation may refer to an absolute value of the difference between the pixel value and the average value. In other words, the mean square deviation of the pixel value of each pixel and the average value in each image block may be first calculated; then, the mean square deviation of each pixel may be summed; and further, the sum of the mean square deviations may be averaged.

To clearly explain the calculation method of the mean square deviation, an implementation method of a threshold comparison unit will be described in detail as follows with reference to FIG. 6. For illustrative purposes, an image block (also referred to as a data block) with 3×3 pixels illustrated in FIG. 6 is used as an example.

(1) Obtaining an average value (average) of the data block illustrated in FIG. 6: average=(a1+a2+a3+a4+a5+a6+a7+a8+a9)/9;

(2) Obtaining an average value (sdv) of the sum of the mean square deviations of the data block: sdv=(|a1−average|+|a2−average|+|a3−average|+|a4−average|+|a5−average|+|a6−average|+|a7−average|+|a8−average|+|a9−average|)/9; and (3) According to the magnitude relationship between the average value (sdv) of the sum of the mean square deviations and a threshold value, assigning 0 or 255 to a corresponding data block.

Thus, the data block with 3×3 pixels may be converted into one pixel, thereby reducing the amount of data in subsequent processes.

FIG. 6 illustrates a data block with 3×3 pixels as an example. If a data block with 8×8 pixels is used, the data brought into the formula may not be the 9 data points of a1, a2, a9, but may be 64 data points of a1, a2, . . . , a64. The calculation method may be similar as the above calculation process, and is not repeated herein. The data block with 8×8 pixels may be converted into one pixel.

S404: Determining whether the average value of the sum of the mean square deviations obtained in S403 is greater than the threshold value, and performing S405 if No or S406 if Yes.

The threshold value may be used to distinguish between the background area and the image area. The pixel values of the background area change little and have a single value, the average value of the sum of the mean square deviations of the data block may be substantially small. On the contrary, the pixel values of the image area change greatly, the average value of the sum of the mean square deviations of the data block may be substantially large.

S405: Assigning a current pixel value of 0 to the data block.

S406: Assigning a current pixel value of 255 to the data block.

S407: Performing an expansion processing on the current data block. In other words, pixels with a pixel value of 255 may be connected, and even if a pixel value of a certain one pixel in the connected region is 0, the pixel value of the one pixel may be re-assigned to 255.

A detailed expansion process using a data block with 3×3 pixels as an example will be described as follows with reference to FIG. 7. Referring to FIG. 7, the expansion process may include summing pixel values in the data block with 3×3 pixels in the leftmost of FIG. 7: Sum=a1+a2+a3+a4+a5+a6+a7+a8+a9. In one embodiment, when the pixel values in the data block with 3×3 pixels are values shown by a matrix in the middle of FIG. 7, Sum=255*8. The expansion process may also include determining whether the result of the summation of the pixel values satisfies the requirement. For example, if (Sum>=255*7), referring to the data block at the rightmost of FIG. 7, the pixel values may be re-assigned: a1=255, a2=255, a3=255, a4=255, a5=255, a6=255, a7=255, a8=255, and a9=255.

S408: Delineating an image area. In other words, the area defined by the expansion processing-processed image area may be delineated as an image data area. The coordinate values of an upper left point and the coordinate values of a lower right point of the expansion processing-processed image area may be obtained as the image area range, and the original image may be cropped to delineate the image area.

At the same time, from top to bottom, a vertical coordinate of a first point having a value of 255 may be obtained, and based on this, a position curve may be constructed. The detailed curve construction process will be described with reference to FIG. 8.

S409: Obtaining an image boundary.

S410: Selecting a predetermined line segment and a starting point and an ending point of the line segment. Two points on the boundary straight line may be selected, and a sampling interval may be set. In other words, a certain line segment on the boundary position curve may be selected, and a coordinate of a starting point and a coordinate of an ending point of the line segment may be obtained.

In the present disclosure, data points may be selected according to two ways. One way for selecting the data points may be to simply set the starting and ending points in the position curve. Another way for selecting the data points may be to choose suitable starting and ending points through a dichotomy method.

Figure 9:
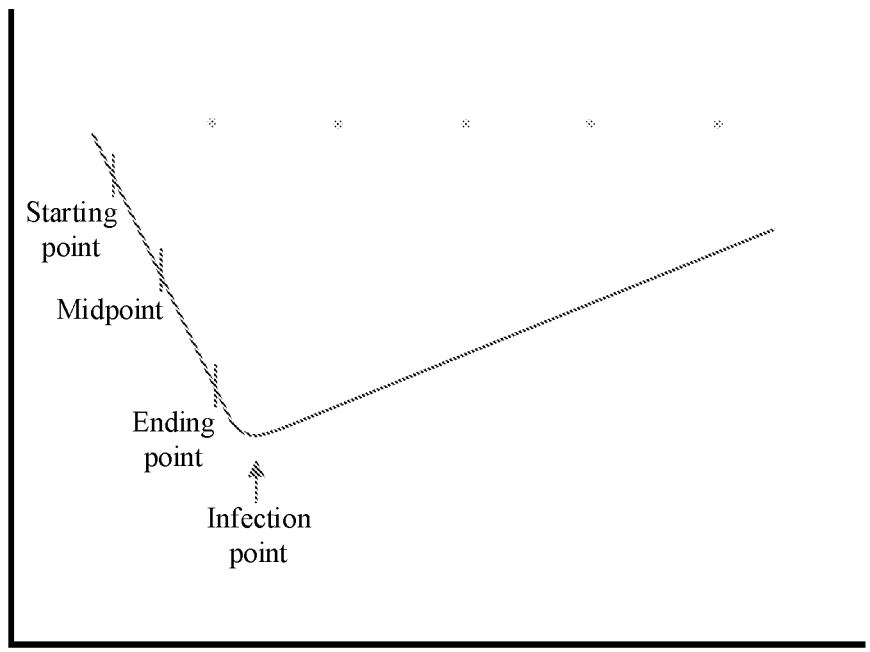
FIG. 9 illustrates a schematic diagram of an exemplary principle for selecting data points through a dichotomy method consistent with various disclosed embodiments of the present disclosure.

The dichotomy method may be performed, including: obtaining an inflection point (e.g., an upper vertex of the image area) in the position curve by calculating gradient information between two points with a fixed distance; determining a midpoint by partitioning a boundary line having equal gradient into M equal parts; and, obtaining a point distance by partitioning the boundary line into N equal parts, where M and N are positive integers. For example, FIG. 9 illustrates detailed selection of the data points.

S411: Calculating a tilt angle of the image. In other words, according to the coordinates of the starting and ending points of the line segment selected in S410, the tilt angle of the line segment with respect to the horizontal line may be calculated: tilt angle $\theta = (Y_{starting} - Y_{ending}) / (X_{starting} - X_{ending})$; where, $Y_{starting}$ represents the ordinate of the starting point, $Y_{ending}$ represents the ordinate of the ending point, $X_{starting}$ represents the abscissa of the starting point, and $X_{ending}$ represents the abscissa of the ending point.

In the method for image processing in the present disclosure, the amount of data required for processing by the device for image processing may be greatly reduced by performing the binarization processing on the original image data, thereby reducing requirements for hardware of the image tilt correction device, and improving image processing speed.

Figure 10:
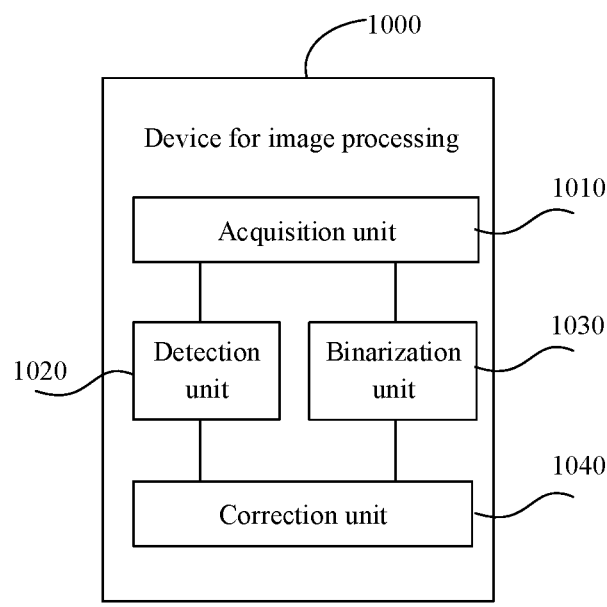
FIG. 10 illustrates a block diagram of an exemplary device for image processing consistent with various disclosed embodiments of the present disclosure.

To implement the processes and methods in the foregoing method for image processing in various embodiments, the present disclosure also provides an exemplary device for image processing. FIG. 10 illustrates a block diagram of an exemplary device for image processing consistent with various disclosed embodiments of the present disclosure. Referring to FIG. 10, in one embodiment, the device for image processing 1000 may include an acquisition unit 1010, a detection unit 1020, a binarization unit 1030, and a correction unit 1040.

The acquisition unit 1010 may be used to acquire original image data. The detection unit 1020 may be used to detect a tilt angle of the image according to the original image data acquired by the acquisition unit 1010. The binarization unit 1030 may be used to perform a binarization processing on the original image data acquired by the acquisition unit 1010 to obtain binarized image data. The binarization processing of the binarization unit 1030 and the detection of the tilt angle of the original image data of the detection unit 1020 may be performed in parallel. The correction unit 1040 may be used to perform rotation correction on the binarized image data according to the tilt angle detected by the detection unit 1020.

In one embodiment, the device for image processing 1000 may further include an identification unit connected to the acquisition unit 1010, and the identification unit may be further connected to the detection unit 1020. The identification unit may be used to identify an image area according to the original image data acquired by the acquisition unit 1010, and to transmit the identified image area to the detection unit 1020 to facilitate the detection unit 1020 detecting the tilt angle of the image for the identified image area. Based on this, the device for image processing 1000 may further include an area acquisition unit and an area delineation unit. The area acquisition unit may be used to according to the image area identified by the identification unit, acquire a corresponding image area in the binarized image data. The area delineation unit may be used to according to the image area in the binarized image data acquired by the area acquisition unit, figure out the image area after removing the background area from the binarized image data acquired by the binarization unit.

In one embodiment, the detection unit 1020 may include a boundary identification unit, a coordinate acquisition unit, and a calculation unit. The boundary identification unit may be used to identify a boundary of the image. The coordinate acquisition unit may be used to acquire coordinates of two data points from a same one boundary of the image. The calculation unit may be used to calculate the tilt angle of the image using the coordinates of the two data points acquired by the coordinate acquisition unit.

In one embodiment, the binarization unit 1030 may include one of a first conversion unit and a second conversion unit. The first conversion unit may be used to convert the original image data into the binarized image data using a threshold matrix algorithm. The second conversion unit may be used to convert the original image data into the binarized image data using an error-diffusion algorithm. The original image data may be M-bit data, and the binarized image data may be N-bit data, where M and N may be natural numbers, and M may be greater than N.

The device for image processing in the present disclosure can perform the method for image processing described in the foregoing embodiments of the present disclosure. The parts not described in detail in the present embodiment may refer to related descriptions of the method for image processing in the foregoing disclosed embodiments of the present disclosure.

The devices and methods described in the present disclosure may be realized through other approaches. In other words, the description on the methods and devices in the present disclosure may only be examples for illustration purposes. For instance, the units may be merely defined based on their logical functions, and in actual applications, the units may be defined based on other criteria. For example, multiple units or components may be combined together or be integrated into another system, or some features may be ignored or may not be executed. Moreover, one unit may be divided into a plurality of units or components.

Figure 11:
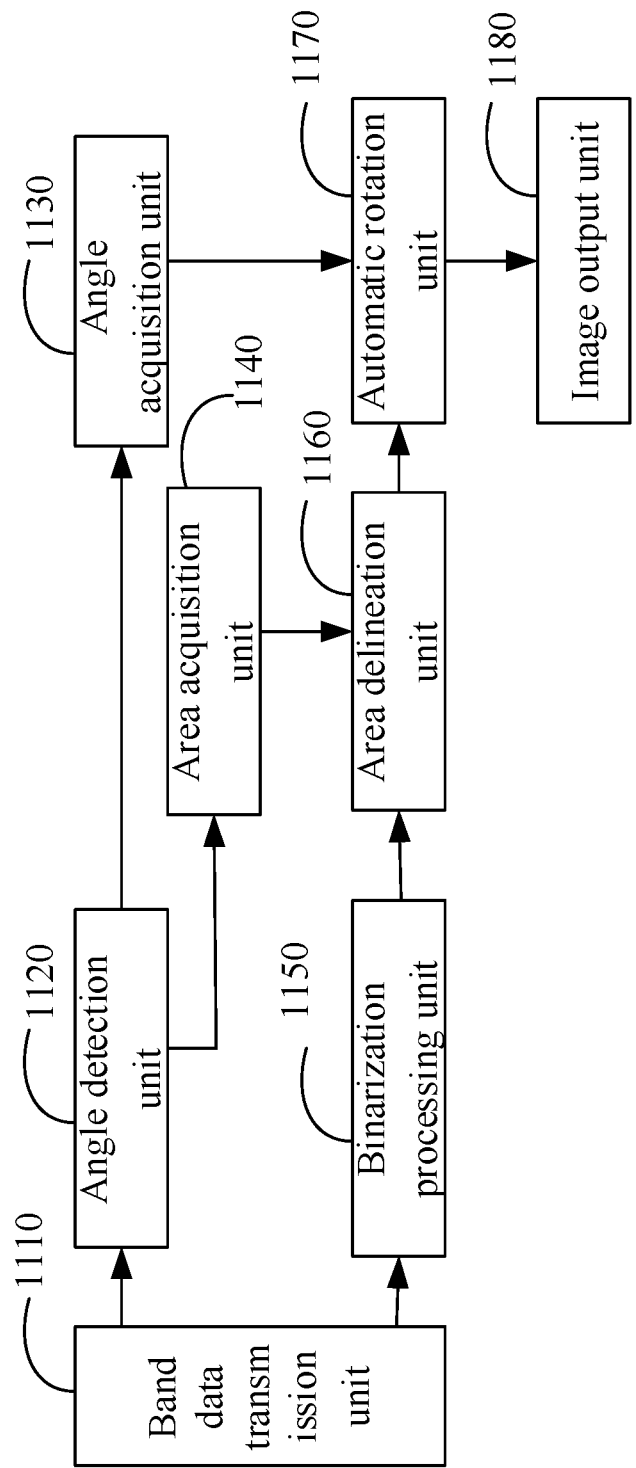
FIG. 11 illustrates a block diagram of another exemplary device for image processing consistent with various disclosed embodiments of the present disclosure.

FIG. 11 illustrates a block diagram of another exemplary device for image processing consistent with various disclosed embodiments of the present disclosure. Referring to FIG. 11, a Band data transmission unit 1110 may be used to execute the functions of the acquisition unit 1010 in FIG. 10. An angle detection unit 1120 may be used to execute the functions of the foregoing detection unit 1020 and the identification unit. An angle acquisition unit 1130 may be used to execute the functions of the foregoing angle acquisition unit. An area acquisition unit 1140 may be used to execute the functions of the foregoing area acquisition unit. A binarization processing unit 1150 may be used to execute the functions of the foregoing binarization unit 1030. An area delineation unit 1160 may be used to execute the functions of the foregoing area delineation unit. An automatic rotation unit 1170 may be used to execute the functions of the forgoing correction unit 1050. An image output unit 1180 may be used to output image data acquired by the automatic rotation unit 1170 to other devices or apparatus. Each unit or component of the device for image processing in the disclosed embodiments of the present disclosure may be implemented in one of a software manner, a hardware circuit manner, and a combination of software and hardware.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through a combination of hardware and software functional units.

When the integrated units are realized through software functional units, the integrated units may be stored on computer readable storage media. The software functional units may be stored in storage media and may include a plurality of commands to instruct a computer system (such as personal computer, server, network system, etc.) or a processor to execute all or a part of the procedures described in various embodiments. The storage media may include U disk, mobile hard disk, read-only memory (ROM), random-access memory (RAM), magnetic disk, optical disk, or any other appropriate media that can be used to store program codes.

In the device for image processing in the present disclosure, the amount of data required for processing by the device for image processing may be greatly reduced by performing the binarization processing on the original image data, thereby reducing requirements for hardware of the image tilt correction device, and improving image processing speed.

Figure 12:
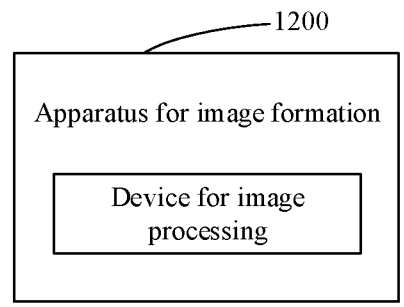
FIG. 12 illustrates a block diagram of an exemplary apparatus for image formation consistent with various disclosed embodiments of the present disclosure.

The present disclosure also provides an apparatus for image formation. FIG. 12 illustrates a block diagram of an exemplary apparatus for image formation consistent with various disclosed embodiments of the present disclosure. Referring to FIG. 12, in one embodiment, the apparatus for image formation 1200 may include a device for image processing. The device for image processing may include any one of the devices for image processing in foregoing embodiments of the present disclosure. Functions of the device for image processing may refer to the corresponding descriptions in the foregoing embodiments, and are not described herein. The apparatus for image formation may be a printing apparatus, an image scanning apparatus, a copying apparatus, a fax apparatus, or a multi-function apparatus, etc. Such apparatus for image formation may be used to form images with the rotation correction of an original image that has a tilt angle.

Figure 13:
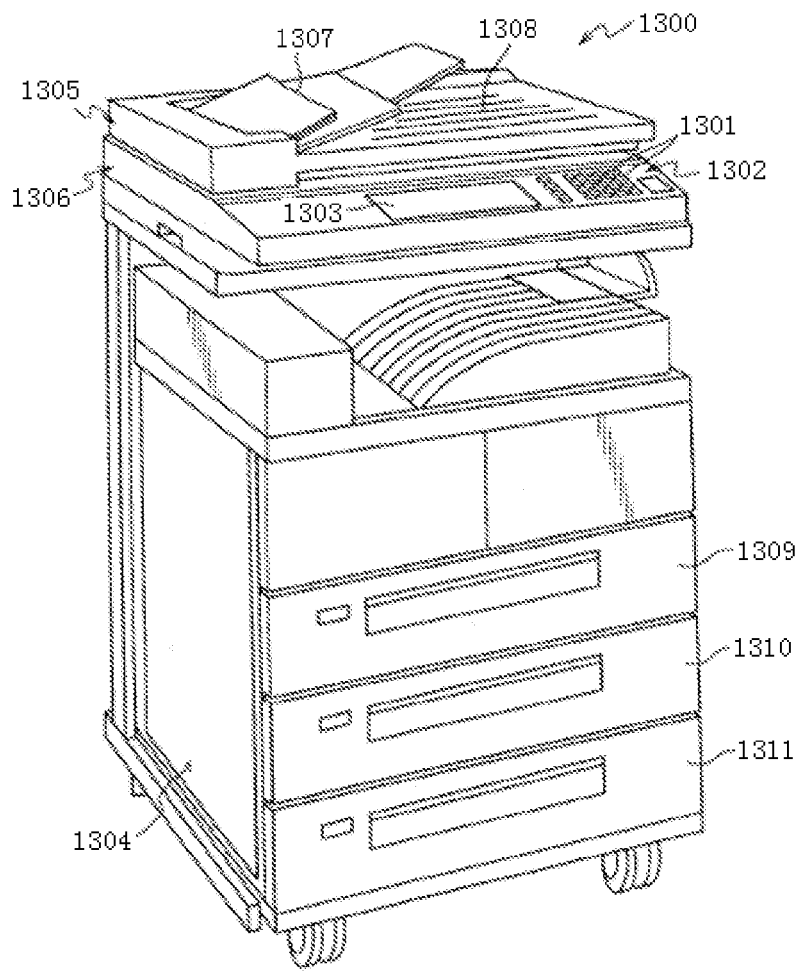
FIG. 13 illustrates a detailed structural schematic diagram of an exemplary apparatus for image formation consistent with various disclosed embodiments of the present disclosure.

FIG. 13 illustrates a detailed structural schematic diagram of an exemplary apparatus for image formation consistent with various disclosed embodiments of the present disclosure. Referring to FIG. 13, the apparatus for image formation 1300 may include an image reader for reading original document data. The image reader may be a contact image sensor (CIS)-type or a charge coupled device (CCD)-type image sensor. When the image reader is a CIS-type image reader, the CIS may directly convert the user's original document data into digital signals. When the image reader is a CCD-type image reader, an A/D conversion unit (analog-to-digital conversion unit) may be desired in addition to the CCD.

Referring to FIG. 13, the apparatus for image formation 1300 may include an input keyboard 1301, a user identification unit 1302, a touch screen 1303, a paper supply unit 1304, a platform 1306, an upper cover 1305, an automatic paper feeding unit 1307, and an automatic paper discharge unit 1308.

The input keyboard 1301 may be provided with numeric buttons for faxing, or shortcut keys for executing functions such as copying, and network connection, etc. The user identification unit 1302 may implement the function of identifying the user by reading the information stored in a specific card. The touch screen 1303 may be used to display a current status of the apparatus for image formation, and may also be used as a touch screen output unit. The paper supply unit 1304 may include three paper supply trays 1309, 1310, and 1311. The platform 1306 may be provided with a glass platen for placing user's document. The upper cover 1305 may be used for placing the user's document on the glass platen when the upper cover is opened. The automatic paper feeding unit 1307 may automatically transfer the documents placed thereon to the image reader. The automatic paper discharge unit 1308 may automatically eject the scanned or printed documents into it.

The apparatus for image formation 1300 may also include the device for image processing in the aforementioned disclosed embodiments. Moreover, the apparatus for image formation 1300 in the present disclosure may further include at least one of a printing apparatus, an image scanning output apparatus, a fax apparatus, and a copying apparatus.

The printing device may include an engine unit, e.g., a high voltage generation unit, a motor, a single and double-sided printing mode switch unit, etc., a Video unit (image data unit) coupled to the engine unit, and an exposure unit connected to the Video unit. The printing device may also include a receiver used to receive job data to be imaged. The job data may be from a computer, a smart terminal or a portable memory connected to the apparatus for image formation. Further, the printing device may include a controller used to convert the job data into commands and parameters capable of being recognized by the engine unit and the Video unit, respectively.

The image scanning output apparatus may be used to send the image processed by the device for image processing to a computer, a smart terminal, or a portable memory connected to the apparatus for image formation via a USB, Net, or wireless network.

The fax apparatus may be used to convert the image data processed by the device for image processing into a format desired for the fax protocol, e.g., a Tiff format file, and then to transmit the converted file to a desired external fax apparatus through a data transmitting unit in the fax apparatus.

The copying apparatus may share the engine unit, and the Video unit, etc., with the printing apparatus, and may convert the image data processed by the device for image processing into commands and parameters capable of being recognized by the engine unit and the Video unit, respectively.

Figure 14:
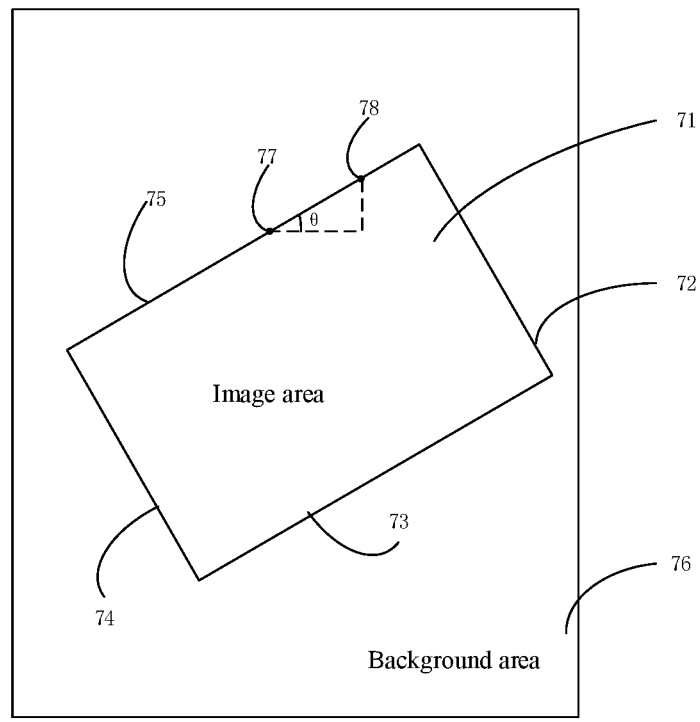
FIG. 14 illustrates a schematic diagram of an exemplary original image read by an image reader consistent with various disclosed embodiments of the present disclosure.
Figure 15:
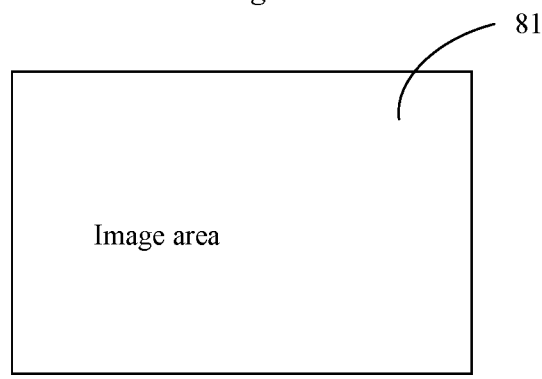
FIG. 15 illustrates a schematic diagram of an exemplary image area obtained by processing the original image in FIG. 14 consistent with various disclosed embodiments of the present disclosure.

The effect of the image tilt automatic correction realized by the method and device for image processing in the foregoing embodiments of the present disclosure may be further described with reference to FIGS. 14 and 15. Referring to FIG. 14, the original image data read by the image reader may include a background area 76 and an image area 71 (an area with an image). The image area in FIG. 14 may be document such as an identification card, or a business card, etc. The image area surrounded by the boundaries 72, 73, 74, and 75 may be identified according to the corresponding tilt angle calculation method and boundary identification method in the device for image processing in the present disclosure. Then, the image area 71 may be automatically cropped from the background area 76. A coordinate of a starting point 77 and a coordinate of an ending point 78 on the upper left boundary line segment may be selected, and a tilt angle θ of the image area may be calculated through the coordinate value of the starting point 77 and the coordinate value of the ending point 78. Further, the cropped image area may be automatically rotated according to the calculated tilt angle, and the rotated image may be illustrated as a image area 81 in FIG. 15.

The apparatus for image formation in the present disclosure may include a device for image processing. The amount of data required for processing by the device for image processing may be greatly reduced by performing the binarization processing on the original image data, thereby reducing requirements for hardware of the image tilt correction device, and improving image processing speed.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for image processing, comprising:
    obtaining original image data, the original image data including a plurality of Band data generated by an image reader, wherein each of the plurality of Band data corresponds to a scanning row;
    detecting a tilt angle of an image according to the original image data, wherein detecting the tilt angle of the image includes identifying a boundary of the image according to the original image data and identifying an image area according to the boundary of the image;
    performing a binarization processing on the original image data to obtain binarized image data, wherein the binarization processing and detecting the tilt angle are performed in parallel; and
    performing a rotation correction on the binarized image data according to the detected tilt angle, so that a rotated binarized image data corresponding to the binarized image data is generated based on the detected tilt angle.

2. The method according to claim 1, wherein detecting the tilt angle of the image includes:
    based on the image area corresponding to the original image data, detecting the tilt angle of the image.

3. The method according to claim 2, wherein performing the binarization processing includes:
    according to the image area corresponding to the original image data, identifying and obtaining an image area corresponding to the binarized image data; and
    according to the image area corresponding to the binarized image data, finding out an image area corresponding to the binarized image data after a background removal.

4. The method according to claim 1, wherein detecting the tilt angle of the image according to the original image data includes:
    obtaining coordinates of two data points from a same boundary of the image; and
    calculating the tilt angle of the image using the coordinates of the two data points.

5. The method according to claim 1, wherein performing the binarization processing on the original image data includes:
    converting the original image data into the binarized image data using one of a threshold matrix algorithm and an error-diffusion algorithm.

6. The method according to claim 1, wherein:
    the original image data is M-bit data, and the binarized image data is N-bit data, wherein M and N are positive integers, and M is greater than N.

7. The method according to claim 1, wherein:
    the image includes a plurality of data blocks, and
    detecting the tilt angle of the image further includes:
        calculating an average value of pixel values of pixels in each data block;
        calculating a mean square deviation of a pixel value of each pixel and the average value in the each data block;
        calculating an average value of a sum of mean square deviations in each data block;
        determining whether the average value of the sum of the mean square deviations in each data block is greater than a threshold value; and
        assigning a pixel value of one of 0 and 255 to a corresponding data block according to a determination result.

8. A device for image processing, comprising:
    a memory, storing program instructions for a method for image processing; and
    one or more processors, coupled to the memory and, when executing the program instructions, configured to:
    obtain original image data, the original image data including a plurality of Band data generated by an image reader, wherein each of the plurality of Band data corresponds to a scanning row;
    detect a tilt angle of an image according to the original image data, wherein detecting the tilt angle of the image includes identifying a boundary of the image according to the original image data and identifying an image area according to the boundary of the image;
    perform a binarization processing on the original image data to obtain binarized image data, wherein the binarization processing and detecting the tilt angle are performed in parallel; and
    perform a rotation correction on the binarized image data according to the detected tilt angle, so that a rotated binarized image data corresponding to the binarized image data is generated based on the detected tilt angle.

9. The device according to claim 8, wherein the one or more processors are further configured to:
    based on the image area corresponding to the original image data, detect the tilt angle of the image.

10. The device according to claim 9, wherein the one or more processors are further configured to:
    according to the image area corresponding to the original image data, identify and obtain an image area corresponding to the binarized image data; and
    according to the image area corresponding to the binarized image data, find out an image area corresponding to the binarized image data after a background removal.

11. The device according to claim 8, wherein the one or more processors are further configured to:
obtain coordinates of two data points from a same boundary of the image; and
calculate the tilt angle of the image using the coordinates of the two data points.

12. The device according to claim 8, wherein the one or more processors are further configured to:
convert the original image data into the binarized image data using one of a threshold matrix algorithm and an error-diffusion algorithm.

13. The device according to claim 8, wherein:
the original image data is M-bit data, and the binarized image data is N-bit data, wherein M and N are positive integers, and M is greater than N.

14. An apparatus for image formation, comprising the device for image processing according to claim 8.

15. A non-transitory computer readable storage medium containing computer-executable program instructions for, when executed by a processor, performing a method for image processing, the method comprising:
obtaining original image data, the original image data including a plurality of Band data generated by an image reader, wherein each of the plurality of Band data corresponds to a scanning row;
detecting a tilt angle of an image according to the original image data, wherein detecting the tilt angle of the image includes identifying a boundary of the image according to the original image data and identifying an image area according to the boundary of the image;
performing a binarization processing on the original image data to obtain binarized image data, wherein the binarization processing and detecting the tilt angle are performed in parallel; and
performing a rotation correction on the binarized image data according to the detected tilt angle, so that a rotated binarized image data corresponding to the binarized image data is generated based on the detected tilt angle.

16. The storage medium according to claim 15, wherein detecting the tilt angle of the image includes:
based on the image area corresponding to the original image data, detecting the tilt angle of the image.

17. The storage medium according to claim 16, wherein performing the binarization processing includes:
according to the image area corresponding to the original image data, identifying and obtaining an image area corresponding to the binarized image data; and
according to the image area corresponding to the binarized image data, finding out an image area corresponding to the binarized image data after a background removal.

18. The storage medium according to claim 15, wherein detecting the tilt angle of the image according to the original image data includes:
obtaining coordinates of two data points from a same boundary of the image; and
calculating the tilt angle of the image using the coordinates of the two data points.

19. The storage medium according to claim 15, wherein performing the binarization processing on the original image data includes:
converting the original image data into the binarized image data using one of a threshold matrix algorithm and an error-diffusion algorithm.

20. The storage medium according to claim 15, wherein:
the original image data is M-bit data, and the binarized image data is N-bit data, wherein M and N are positive integers, and M is greater than N.

* * * * *